United States Patent
Fiallos et al.

(10) Patent No.: US 9,629,151 B2
(45) Date of Patent: Apr. 18, 2017

(54) ANTENNA BUFFER MANAGEMENT FOR DOWNLINK PHYSICAL LAYER

(71) Applicant: Telefonaktiebolaget L M Ericsson (publ), Stockholm (SE)

(72) Inventors: Edgard Fiallos, Ottawa (CA); Christien LeBlanc, Moncton (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 239 days.

(21) Appl. No.: 14/433,143

(22) PCT Filed: Mar. 30, 2015

(86) PCT No.: PCT/IB2015/052346
§ 371 (c)(1),
(2) Date: Apr. 2, 2015

(87) PCT Pub. No.: WO2016/156918
PCT Pub. Date: Oct. 6, 2016

(65) Prior Publication Data
US 2017/0048849 A1    Feb. 16, 2017

(51) Int. Cl.
*H04W 24/00*      (2009.01)
*H04W 72/04*      (2009.01)
*H04L 12/879*     (2013.01)
*H04L 12/861*     (2013.01)
*H04W 56/00*      (2009.01)
*G06F 13/16*      (2006.01)

(52) U.S. Cl.
CPC .... *H04W 72/0446* (2013.01); *G06F 13/1673* (2013.01); *H04L 49/901* (2013.01); *H04L 49/9005* (2013.01); *H04W 56/001* (2013.01)

(58) Field of Classification Search
None
See application file for complete search history.

(56) References Cited

U.S. PATENT DOCUMENTS

| | | |
|---|---|---|
| 2004/0170187 A1 | 9/2004 | Back |
| 2010/0067499 A1* | 3/2010 | Oota ............. H04L 5/0087 370/336 |
| 2011/0035522 A1 | 2/2011 | Tan et al. |
| 2013/0210491 A1* | 8/2013 | Eriksson ........ H04W 16/24 455/562.1 |

(Continued)

FOREIGN PATENT DOCUMENTS

WO    03019350 A1    3/2003

OTHER PUBLICATIONS

International Search Report and Written Opinion dated Feb. 3, 2016 for International Application No. PCT/IB2015/052346, International Filing Date: Mar. 30, 2015 consisting of 13-pages.

(Continued)

*Primary Examiner* — Marcus R Smith
*Assistant Examiner* — Duc Duong
(74) *Attorney, Agent, or Firm* — Christopher & Weisberg, P.A.

(57) ABSTRACT

A method and system for managing a transmission buffer memory at a base station in a wireless communication system, the base station having a plurality of cells, the memory being circular and shared among the cells so that memory fragmentation when cells are removed or added is avoided.

24 Claims, 10 Drawing Sheets (56) References Cited

U.S. PATENT DOCUMENTS

2014/0126303 A1    5/2014  Mutchnik
2015/0312958 A1*  10/2015  Cheng ................. H04B 7/0413
                                                    370/252
2016/0192388 A1*   6/2016  Ekpenyong ....... H04W 72/1284
                                                    370/329

OTHER PUBLICATIONS

3GPP TS 36.211 V8.5.0 (Dec. 2008) 3rd Generation Partnership Project; Technical Specification Group Radio Access Network; Evolved Universal Terrestrial Radio Access (E-UTRA); Physical Channels and Modulation (Release 8) Dec. 18, 2008 consisting of 82-pages.

3GPP TS 36.212 V8.5.0 (Dec. 2008) 3rd Generation Partnership Project; Technical Specification Group Radio Access Network; Evolved Universal Terrestrial Radio Access (E-UTRA); Multiplexing and channel coding (Release 8) Dec. 18, 2008 consisting of 58-pages.

* cited by examiner

ANTENNA BUFFER MANAGEMENT FOR DOWNLINK PHYSICAL LAYER

TECHNICAL FIELD

This written description relates wireless communications, and in particular to a method and system for managing a transmission buffer memory at a base station in a wireless communication system.

BACKGROUND

In a wireless communication system, a base station communicates with wireless devices in a plurality of cells, each cell corresponding to a particular geographic area. Some or all of these cells may be activated at the same time. Each cell is associated with one or more antennas that radiate into the geographic coverage area of the cell to establish and maintain communications with the wireless devices in the cell.

Figure 1:
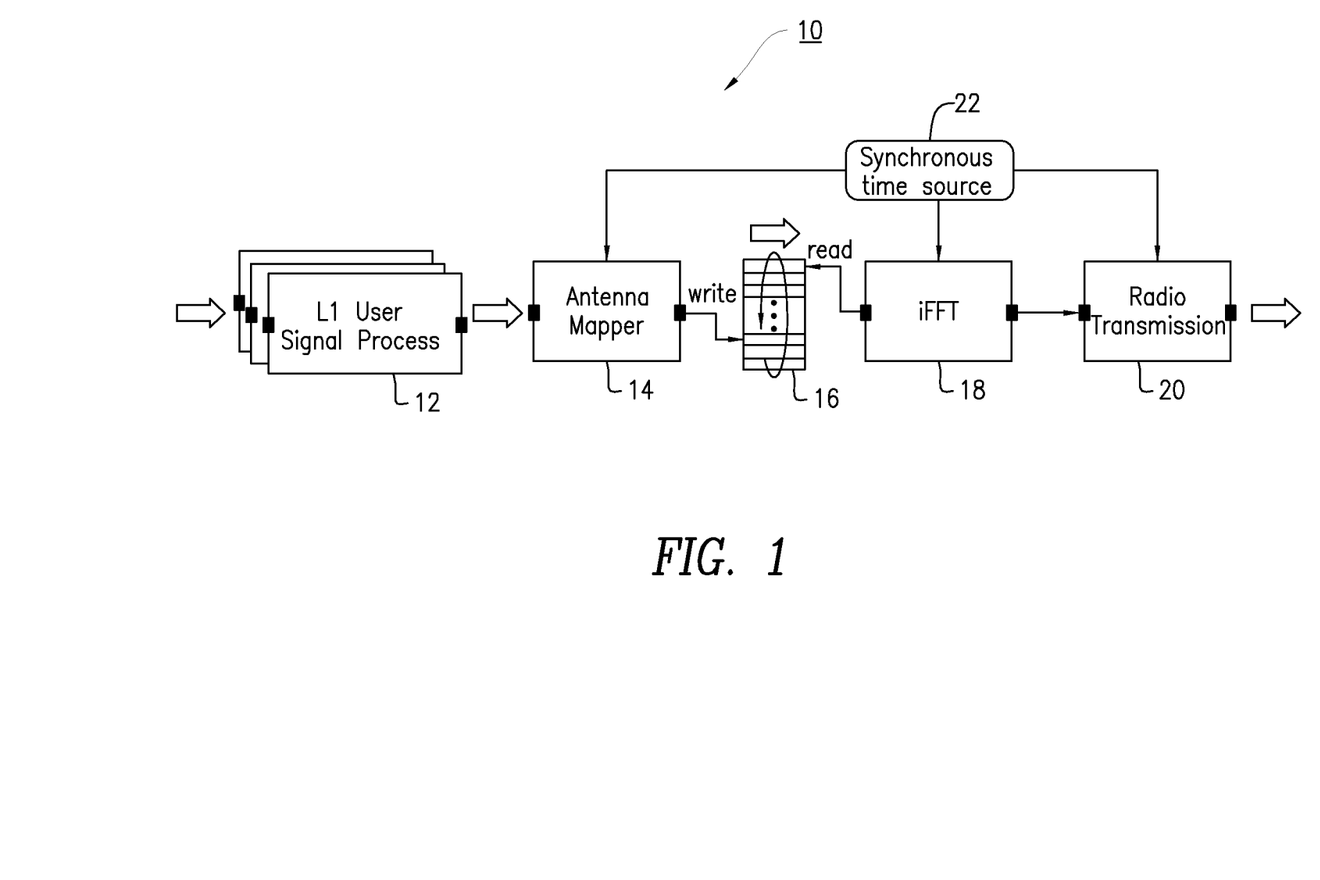
FIG. 1 is a block diagram of a path for processing and transmitting downlink symbols to a cell coverage area.

FIG. 1 is a block diagram of one path 10 in a base station for processing and transmitting downlink symbols to a cell coverage area. A processing unit 12 forms symbols of information and sends these symbols to an antenna mapper 14. Each cell is associated with an antenna mapper 14 which receives and stores symbols to be transmitted into the cell coverage area. Each symbol is written to a memory location in a transmission buffer memory 16. An inverse Fast Fourier Transformer, (iFFT), 18 reads a symbol from the transmission buffer memory 16, transforms the symbol and forwards the transformed symbol to a radio transmitter 20 which has a power amplifier and an antenna to amplify and transmit the symbol to a cell coverage area. The process of writing a symbol from the antenna mapper 14 to the transmission buffer memory 16 is synchronized by a timing source 22 with the reading of a symbol from the transmission buffer memory 16 by the iFFT 18, and is also synchronized with transmission by the radio transmitter 20.

As modern deployments of base station have 24, 48 or higher numbers of cells, the amount of transmission buffer memory required becomes a substantial cost. Further, many systems may store two TTI buffers per symbol to create a "ping pong" scheme, thereby doubling the required memory. Also, as cells of a base station are dynamically deployed without shutting down the base station, fragmentation of memory results.

Figure 2:
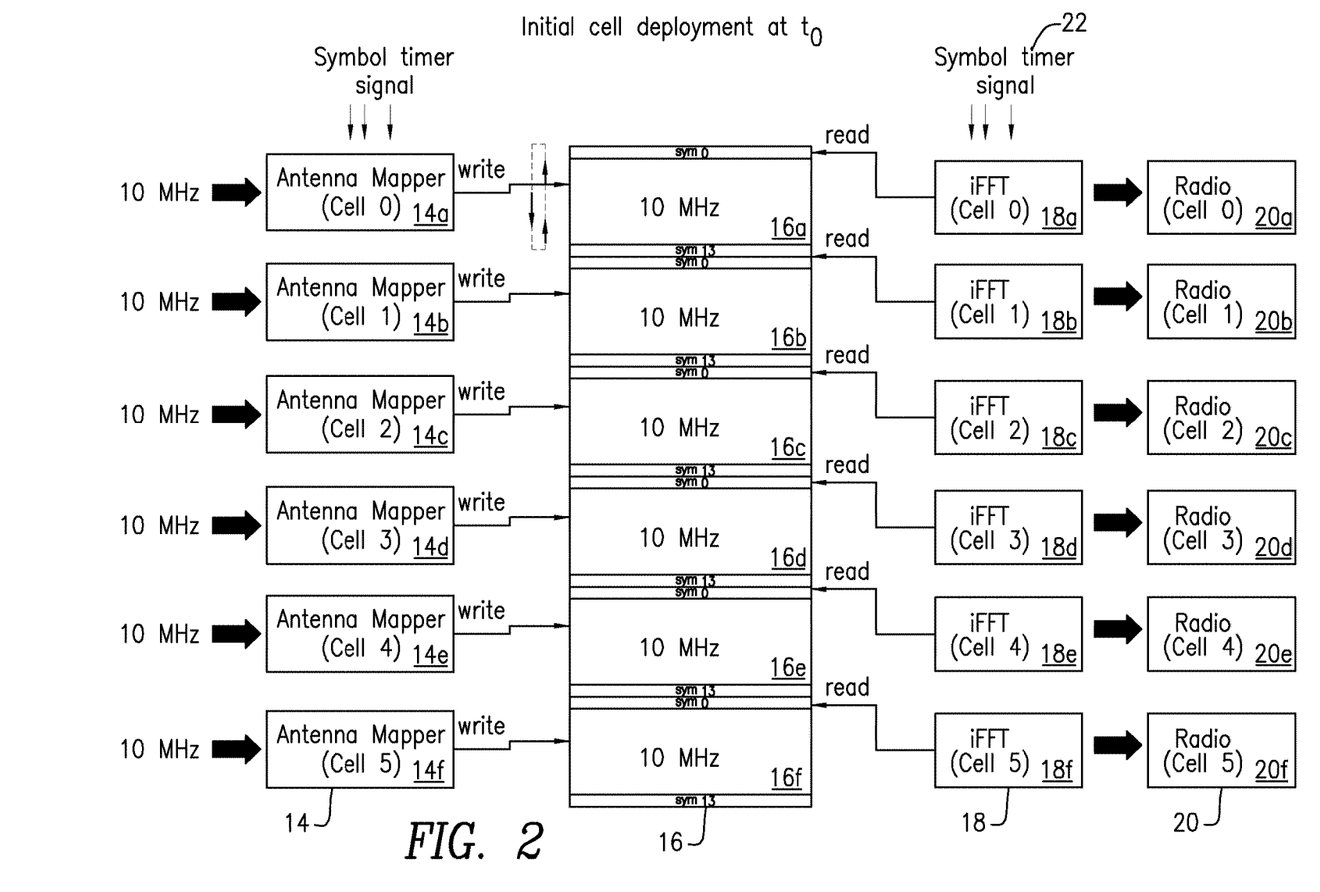
FIG. 2 is a block diagram of a configuration at a base station in which 6 cells are activated in an initial cell deployment.

An example of a buffer reallocation problem due to fragmentation is explained with reference to FIGS. 2-5. FIG. 2 is a block diagram of a configuration at a base station in which 6 cells are activated in an initial cell deployment at a time $t_o$. Note that in a typical implementation, there may be many more cells, for example, 20 to 50 cells. In the configuration of FIG. 2, each cell has a bandwidth of 10 Mega-Hertz (MHz). In other deployments, different cells may have different bandwidths. Each cell has its own antenna mapper 14a-f, referred to herein collectively as antenna mappers 14. Each mapper 14 writes symbols to a different memory segment 16a-f of the transmission buffer memory 16. The size of an address space of a memory segment to which a symbol of a cell is written is proportional to the bandwidth of the cell.

Each memory segment 16a-f is read by a corresponding one of iFFTs 18a-f, referred to herein collectively as iFFTs 18. Each memory segment 16a-f is a circular memory, which means that a memory segment is written to progressively from a first memory address to a last memory address of the memory segment, and when the last memory address is written to, the writing starts anew at the first memory address of the memory segment. Each iFFT 18a-f is coupled to a respective radio 20a-f, referred to herein collectively as radios 20. The reading and writing for each memory segment 16a-f is synchronized by symbol timer signals from the timing source 22, so that a writing to one address of a memory segment coincides with a reading from another address of that same memory segment.

Figure 3:
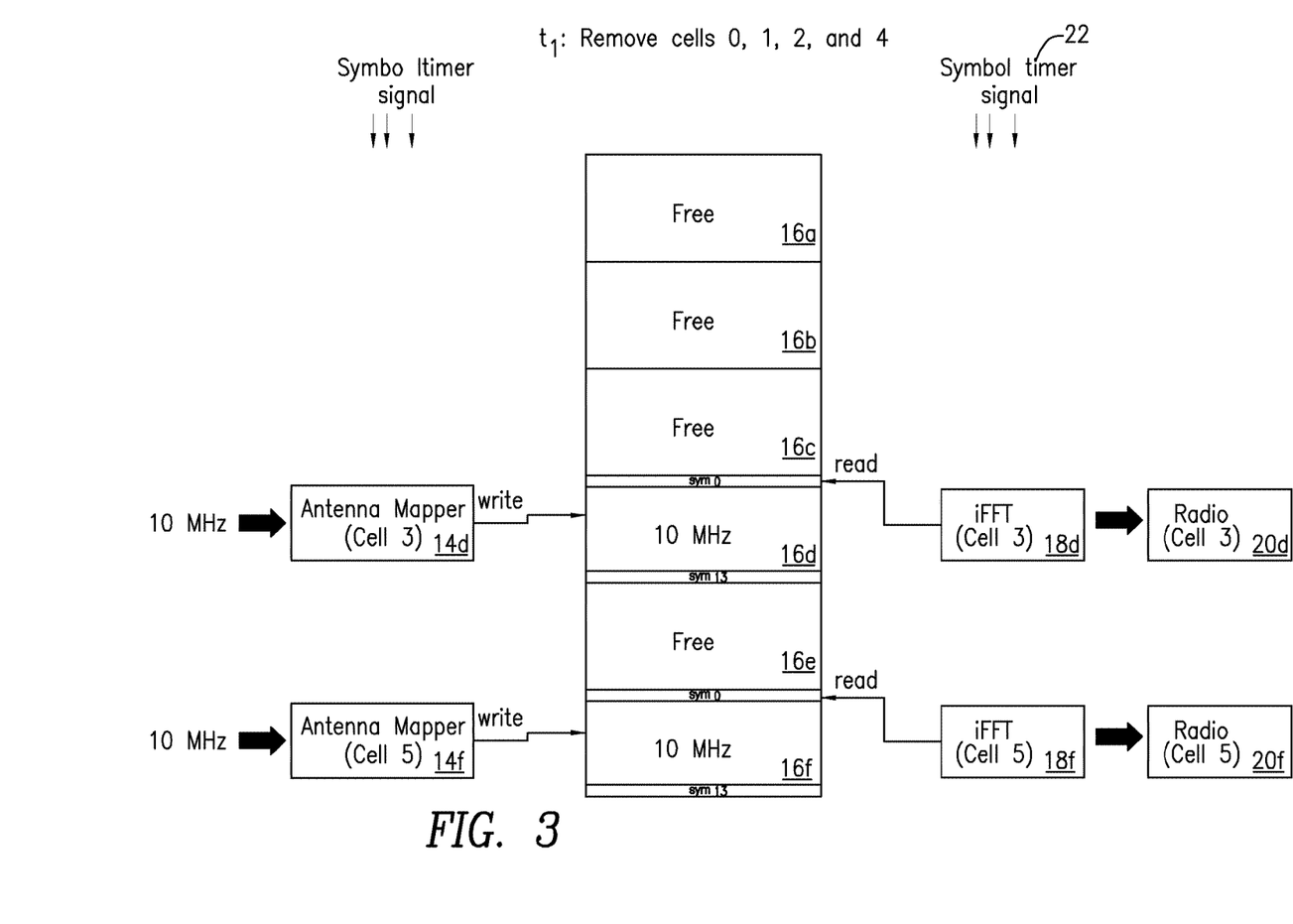
FIG. 3 shows a deployment of the base station at a subsequent time with some cells removed.
Figure 4:
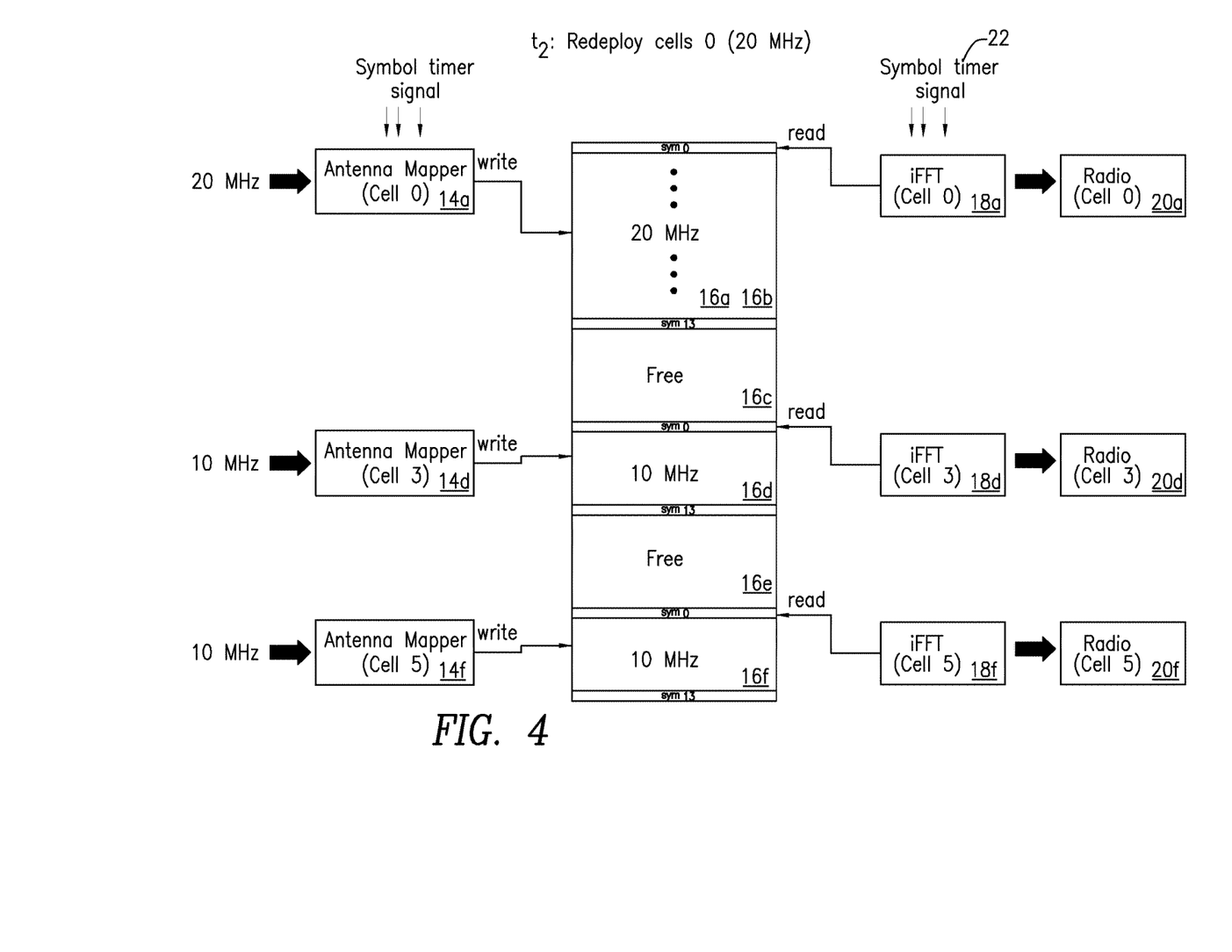
FIG. 4 shows a deployment of the base station with a new cell added.
Figure 5:
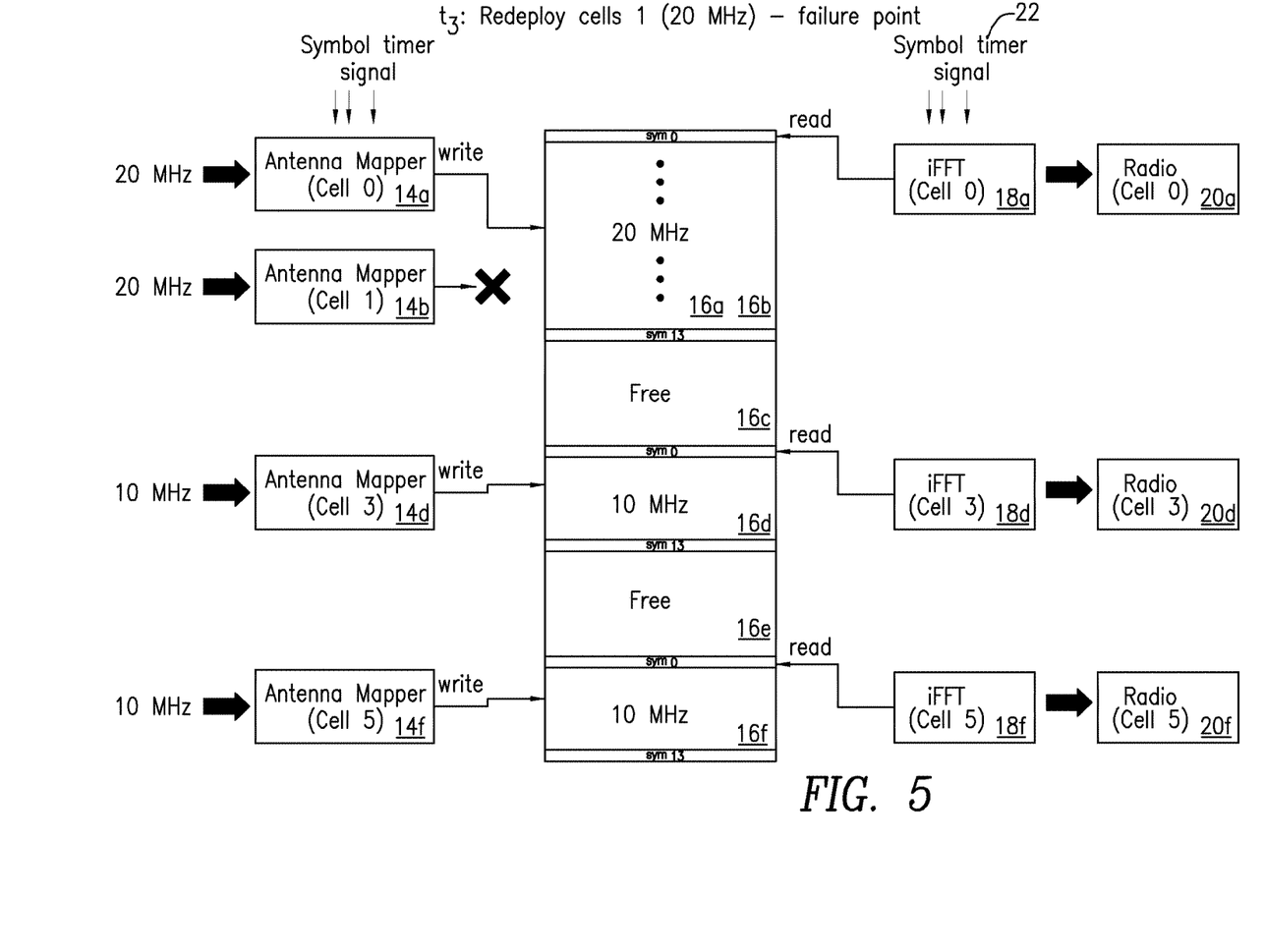
FIG. 5 shows a deployment of the base station with another new cell added indicating memory fragmentation.

FIG. 3 shows a deployment of the base station at a time $t_1$ subsequent to, where cells 0, 1, 2, and 4 have been removed, leaving only cells 3 and 5. Removal of cells may be the result of reconfiguration of the base station owing to the desire to reallocate bandwidth among supported cells. Memory segments 16a-16c and 16e are now free. FIG. 4 shows a subsequent deployment at time $t_2$ where a new cell 0 having a bandwidth of 20 MHz is added, and utilizes memory segments 16a and 16b, each corresponding to a 10 MHz cell, of the transmission buffer memory 16. FIG. 5 shows an attempted deployment at a subsequent time $t_3$ of a new cell 1 having a 20 MHz bandwidth. Even though there enough total buffer memory to support a 20 Mhz cell, the redeployment fails because there is not 20 MHz of contiguous memory remaining in the transmission buffer memory 16. As is shown, there are two discontiguous portions that total the amount of buffer memory required. In other words, the memory is fragmented. Allocation of memory segments 16c and 16e to cell 1 would require memory de-allocation and lead to complex memory management requirements, or an undesirable reboot of the base station would need to be made to rearrange the memory allocations. Operators do not like to have to reboot base stations as such an action disconnects users calls, delays reconnection, and may adversely impact operators who have no relationship to the reallocation issue.

SUMMARY

The present disclosure advantageously provides a method and buffer manager for managing a transmission buffer memory at a base station in a wireless communication system. According to one aspect, the transmission buffer memory is a circular memory writable by a plurality of producers and a readable by a plurality of buffer consumers. There is a corresponding producer for each of a plurality of active cells of the base station. There is also a corresponding buffer consumer for each of the plurality of active cells.

For each active cell of the base station, a size of an address space of the transmission buffer memory configured to store a symbol of the corresponding active cell is determined, the size of the address space being proportional to a bandwidth of the active cell to which a symbol corresponds. A first address in the transmission buffer memory at which a symbol of a first cell of the plurality of active cells is to be written is determined. A second address in the transmission buffer memory at which a symbol of a second active cell of the plurality of active cells is to be written is determined, the second address being offset from the first address by an address space of the first cell.

A first producer is triggered to write a symbol of the first cell of the plurality of active cells to the transmission buffer memory at the first address. A second producer is triggered to write a symbol of the second cell of the plurality of active cells to the transmission buffer memory at the second address. A buffer consumer is triggered to read a symbol from the transmission buffer memory at an address that is offset from the first address by a predetermined amount.

According to this aspect, some embodiments include synchronizing timing of the reading from and writing to the transmission buffer memory of symbols of a cell. In some embodiments, the predetermined amount is an amount of memory sufficient to store symbols of additional cells of the base station to be activated. In some embodiments, the predetermined amount is sufficient to avoid overwrite of data caused by software jitter. In some embodiments, the reading of symbols of cells from the transmission buffer memory is serialized so that a symbol is read for one cell after another and wherein the writing of symbols of the cells to the transmission buffer memory is serialized so that a symbol is written for one cell after another.

In some embodiments, the total memory of the transmission buffer memory is based on a total number of cells supportable by the base station and an expected bandwidth of each cell. In some embodiments, the offset is an integer number N of symbols. Some embodiments further include writing a symbol from a producer corresponding to a newly activated cell, the writing being at an address offset from the address most recently written by a producer corresponding to a previously existing cell by the address space of the previously existing cell. Some embodiments further include de-assigning an address assigned to a cell when the cell is deactivated. Some embodiments further include storing: a size of an address space of the transmission buffer memory for each cell; an address of each symbol written to the transmission buffer memory; and an address of the transmission buffer memory to write a next symbol.

According to another aspect, a transmission buffer memory manager for managing a transmission buffer memory at a base station serving a plurality of cells is provided. The transmission buffer memory is a circular memory writable by a plurality of producers, there being a corresponding producer for each of a plurality of active cells of the base station. The transmission buffer memory is readable by a plurality of buffer consumers, there being a corresponding buffer consumer for each of the plurality of active cells.

The transmission buffer memory manager includes a processor and a memory. The memory is configured to store computer instructions that, when executed by the processor, configure the processor to determine for each active cell of the base station, a size of an address space of the transmission buffer memory configured to store a symbol of the corresponding active cell. The size of the address space is proportional to a bandwidth of the cell to which a symbol corresponds. The processor is also configured to determine a first address in the transmission buffer memory at which a symbol of a first cell of the plurality of active cells is to be written. The processor is also configured to determine a second address in the transmission buffer memory at which a symbol of the a second active cell of the plurality of active cells is to be written, the second address being offset from the first address by an address space of the first cell.

The processor is also configured to trigger a first producer to write a symbol of the first cell of the plurality of active cells to the transmission buffer memory at the first address. The processor is also configured to trigger a second producer to write a symbol of the second cell of the plurality of active cells to the transmission buffer memory at the second address; and trigger a buffer consumer to read a symbol from the transmission buffer memory at an address that is offset from the first address by a predetermined amount.

According to this aspect, some embodiments include a timing source to synchronize the reading from and writing to the transmission buffer memory of symbols of a cell. In some embodiments, the predetermined amount is an amount of memory sufficient to store symbols of additional cells of the base station to be activated. In some embodiments, the predetermined amount is sufficient to avoid overwrite of data caused by software jitter. In some embodiments, the processor is configured to serialize the reading of symbols of cells from the transmission buffer memory so that a symbol is read for one cell after another and to serialize the writing of symbols of the cells to the transmission buffer memory so that a symbol is written for one cell after another.

In some embodiments, the total memory of the transmission buffer memory is based on a total number of active cells supportable by the base station and an expected bandwidth of each active cell. In some embodiments, the offset is an integer number N of symbols. In some embodiments, the processor is further configured to write a symbol from a producer corresponding to a newly activated cell, the writing being at an address offset from the address most recently written by a producer corresponding to a previously existing cell by the address space of the previously existing cell. In some embodiments, the processor is further configured to de-assign an address assigned to a cell when the cell is deactivated. Some embodiments further include additional memory to store: a size of an address space of the transmission buffer memory for each cell; an address of each symbol written to the transmission buffer memory; and an address of the transmission buffer memory to write a next symbol.

According to another aspect, embodiments include a transmission buffer memory manager for managing a transmission buffer memory at a base station serving a plurality of cells. The transmission buffer memory is a circular memory writable by a plurality of producers, there being a corresponding producer for each of a plurality of active cells of the base station. The transmission buffer memory is readable by a plurality of buffer consumers, there being a corresponding buffer consumer for each of the plurality of active cells.

The transmission buffer memory manager includes an address space size determination module configured to determine for each active cell of the base station. A size of an address space of the transmission buffer memory is configured to store a symbol of the corresponding active cell, the size of the address space being proportional to a bandwidth of the cell to which a symbol corresponds. The transmission buffer memory manager includes an address determination module configured to determine a first address in the transmission buffer memory at which a symbol of a first cell of the plurality of active cells is to be written; and to determine a second address in the transmission buffer memory at which a symbol of the a second active cell of the plurality of active cells is to be written, the second address being offset from the first address by an address space of the first cell.

The transmission buffer memory manager further includes a triggering module configured to: trigger a first producer to write a symbol of the first cell of the plurality of active cells to the transmission buffer memory at the first address; trigger a second producer to write a symbol of the second cell of the plurality of active cells to the transmission buffer memory at the second address; and trigger a buffer consumer to read a symbol from the transmission buffer memory at an address that is offset from the first address by a predetermined amount.

According to this aspect, some embodiments include a timing source module configured to synchronize the reading from and writing to the transmission buffer memory of symbols of a cell. In some embodiments the triggering module is further configured to serialize the reading of symbols of cells from the transmission buffer memory so that a symbol is read for one cell after another and to serialize the writing of symbols of the cells to the transmission buffer memory so that a symbol is written for one cell after another. In some embodiments, the total memory of the transmission buffer memory is based on a total number of cells supportable by the base station and an expected bandwidth of each cell.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Before describing in detail exemplary embodiments, it is noted that the embodiments reside primarily in combinations of apparatus components and processing steps related to managing a transmission buffer memory in a base station serving multiple cells in a wireless communication system. Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Note that although long term evolution (LTE) terminology has been used in this disclosure to exemplify some embodiments, this should not be seen as limiting the scope of the embodiments to only the aforementioned system. Other wireless systems, including LTE-A, WiMax, ultra-mobile broadband (UMB) and global system for mobile communications (GSM), may also benefit from applying embodiments discussed herein.

Also note that terminology such as NodeB or eNB and UE should be considering non-limiting and does not imply a certain hierarchical relation between the two; in general "NodeB" could be considered as device 1 and "UE" device 2, and these two devices communicate with each other over some radio channel Also, a UE is just one embodiment of a wireless device served by a base station.

Also note that, in a cellular network deployment one cell may have more than one antenna. For ease of explanation and understanding of the embodiments, the simplest configuration which is one antenna per cell is described. As such the use of the word "cell" to describe the embodiments, does not preclude having multiple antennas per cell. In other words, there can be multiple producers, e.g., antenna mappers, buffer consumers, e.g., iFFTs, and radios per cell.

Some embodiments provide a method for managing a transmission buffer memory for a base station having a plurality of cells that avoids memory fragmentation when cells are removed and added. The transmission buffer memory is a single shared circular memory that may be written to by a plurality of producers, such as antenna mappers, and read from by a plurality of buffer consumers, such as iFFTs.

For each active cell of the base station, a size of an address space for storing a symbol of the active cell is proportional to the bandwidth of the active cell to which the symbol corresponds. Symbols of different cells may be written (produced) one after another and symbols of different cells may be read (consumed) one after another. When a buffer consumer consumes a symbol at address X, a corresponding producer may produce a symbol at address X+N, where N is large enough to account for software jitter and large enough to account for the memory required if more active cells are added. When a new cell is deployed, the producer for the new cell writes a symbol to the shared memory consecutively following the most recently written symbol of another cell. Since the memory is shared and allocated synchronously without fragmentation, less total memory is required for a given number of cells having a given total bandwidth, and rebooting of the base station is not required when making changes to the cell allocation, i.e., cell bandwidth changes, since the memory can be reallocated "on the fly". Further, use of the synchronous, dynamic memory as described herein, obviates any memory de-allocation requirement. This results in a memory arrangement that is easier to use than known systems.

Figure 6:
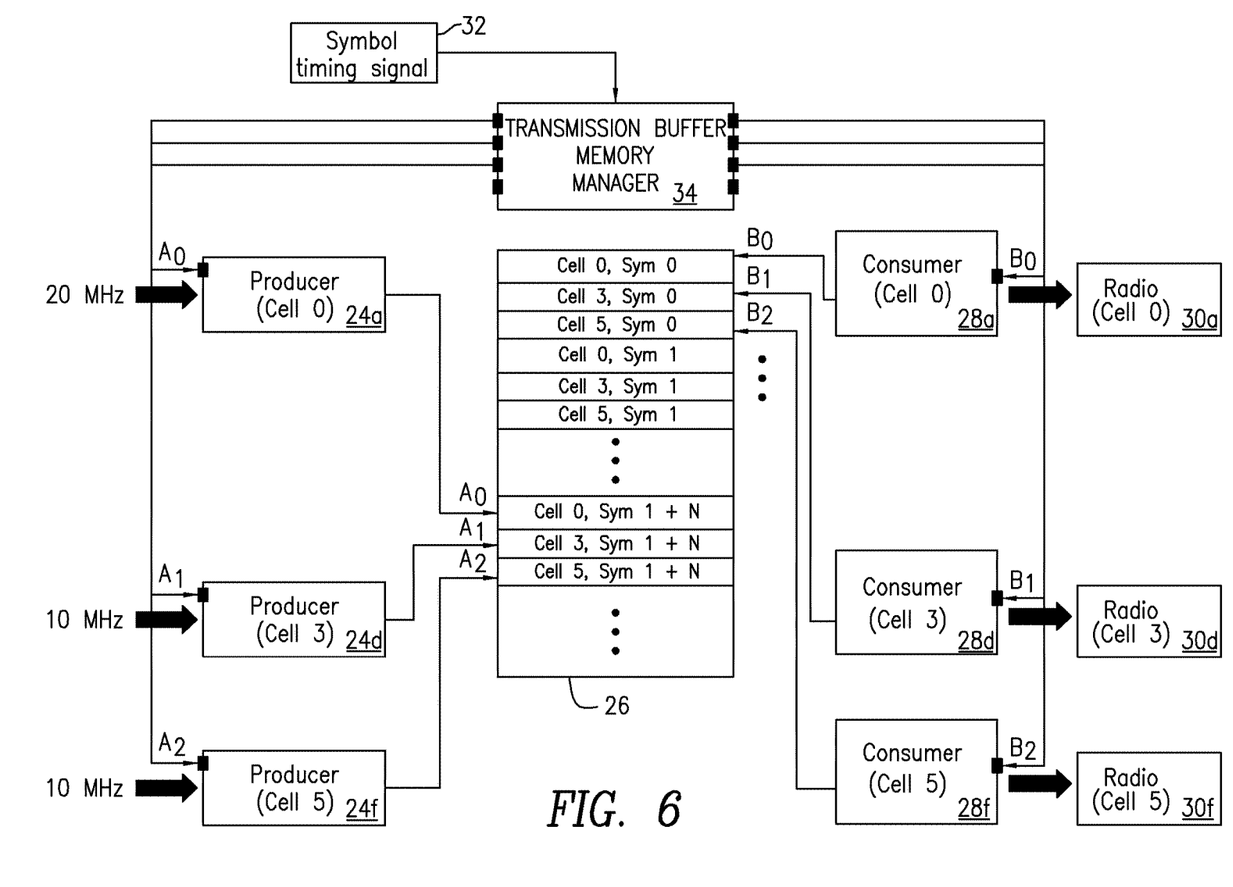
FIG. 6 is a block diagram of an exemplary embodiment for managing a transmission buffer memory for a base station having a plurality of cells.

An exemplary embodiment for managing a transmission buffer memory for a base station having a plurality of cells that avoids memory fragmentation when cells are removed and added is described with reference to FIG. 6. Each active cell, e.g., Cells 0, 3 and 5, has a producer 24 which may be an antenna mapper. Each active cell also has a corresponding buffer consumer 28, which may be an iFFT, and a radio 30. In FIG. 6, cell 0 has a bandwidth of 20 MHz, whereas cells 3 and 5 have bandwidths of 10 MHz each. Thus, different cells may have different bandwidths. Of note, although FIG. 6 shows three cells having specific bandwidths, it is understood that the embodiments are not limited to the precise arrangement shown. There can be more or fewer than three cells and each cell can have a bandwidth different from that shown in FIG. 6 (or any other figure).

The transmission buffer memory 26 is a written to and read from as a circular memory and is shared by all of the active cells. The size of an address space for a symbol of a cell is proportional to the bandwidth of that cell. Thus, an address space for a symbol of cell 0 having a 20 MHz bandwidth is twice the size of an address space for a symbol of cell 3 or 5, shown in FIG. 6 as having a 10 MHz bandwidth. In some embodiments, the total size of the transmission buffer memory 26 is proportional to the total bandwidth of a specified number of cells. For example, for a base station of six cells of 10 MHz per cell would require half as much transmission buffer memory as a base station of six cells of 20 MHz per cell.

The reading from and writing to the transmission buffer memory 26 is synchronized by a symbol timing signal 32. The symbol timing signal 32 provides timing to a transmission buffer memory manager 34 that provides read and write addresses and read and write signals to control the timing and addresses of reads and writes to/from the transmission buffer memory 26.

In operation, each producer 24, is triggered to write one symbol at a time (producers 24*a-f* are collectively referred to as producer 24). For example, producer 24*a* is triggered by the transmission buffer memory manager 34 to write a symbol to address A0 of the transmission buffer memory 26. In synchronization with the writing of a symbol to address A0 for cell 0, the transmission buffer memory manager 34 triggers the buffer consumer 28*a* to read a symbol at address B0 of the transmission buffer memory 26 for cell 0. Each buffer consumer 28 (buffer consumers 28*a-f* are collectively referred to as buffer consumers 28) is triggered to read one symbol at a time. The address A0 is equal to the address B0+N where N is large enough to account for software jitter and large enough to account for the memory required if more active cells are added. The larger the value of N, the more jitter can be tolerated at the expense of increasing the size of the transmission buffer memory 26.

The next producer 24*d* is directed by the transmission buffer memory manager 34 to write a symbol to address A1 of the transmission buffer memory 26 for cell 3. In synchronization with the writing of the symbol to address A1 for cell 3, the transmission buffer memory manager 34 triggers the buffer consumer 28*d* to read a symbol at address B1 of the transmission buffer memory 26 for cell 3. The process continues in the same manner until the last write address of the memory is reached, at which time the process continues to write at A0. Note that the memory address being read by a buffer consumer 28 at time t has been written by a producer 24 at time t-N symbols. All read/write transactions take place serially at symbol boundaries such that no gaps in successive read/write locations occurs. In this way, the transmission buffer memory 26 is never fragmented. More particularly, the transmission buffer memory manager 34 is configured to serialize the reading and writing of symbols for one cell after another.

Thus, the transmission buffer memory manager 34, operating according to timing provided by the symbol timing signal 32, provides read and write commands and read and write addresses to the producers 24 and buffer consumers 28. The transmission buffer memory manager 34 determines, for each active cell, a size of an address space for a symbol of the cell, the size of the address space being proportional to a bandwidth of the active cell. The transmission buffer memory manager 34 determines a first address at which a symbol of a first cell is to be written and issues a first write command to the producer 24*a* for the first cell to write the symbol of the first cell. The transmission buffer memory manager 34 determines a second address at which a symbol of a second cell is to be written and issues a second write command to the producer 24*a* for the second cell to write the symbol of the second cell. The second address is offset from the first address by an address space allocated to the symbol of the first cell.

At the time of issuing the write command to the producer 24*a* for the first cell, the transmission buffer memory manager 26 issues a read command to the buffer consumer 28*a* of the first cell causing the buffer consumer 28*a* of the first cell to read a symbol of the first cell. The address at which the read is to occur is offset from the first address at which a symbol of the first cell is written by a predetermined amount N.

The symbol timing signal 32 provides precise timing which may be used not only to synchronize reads and writes to the transmission buffer memory 26, but also provides timing for other base station functions. In some embodiments, the symbol timer signal clocks 14 times per 1 millisecond subframe. The radios 30 ((radios 30*a-f* are collectively referred to as radios 30) convert digital samples from the buffer consumers 28 into RF signals for transmission over the air via an antenna.

Figure 7:
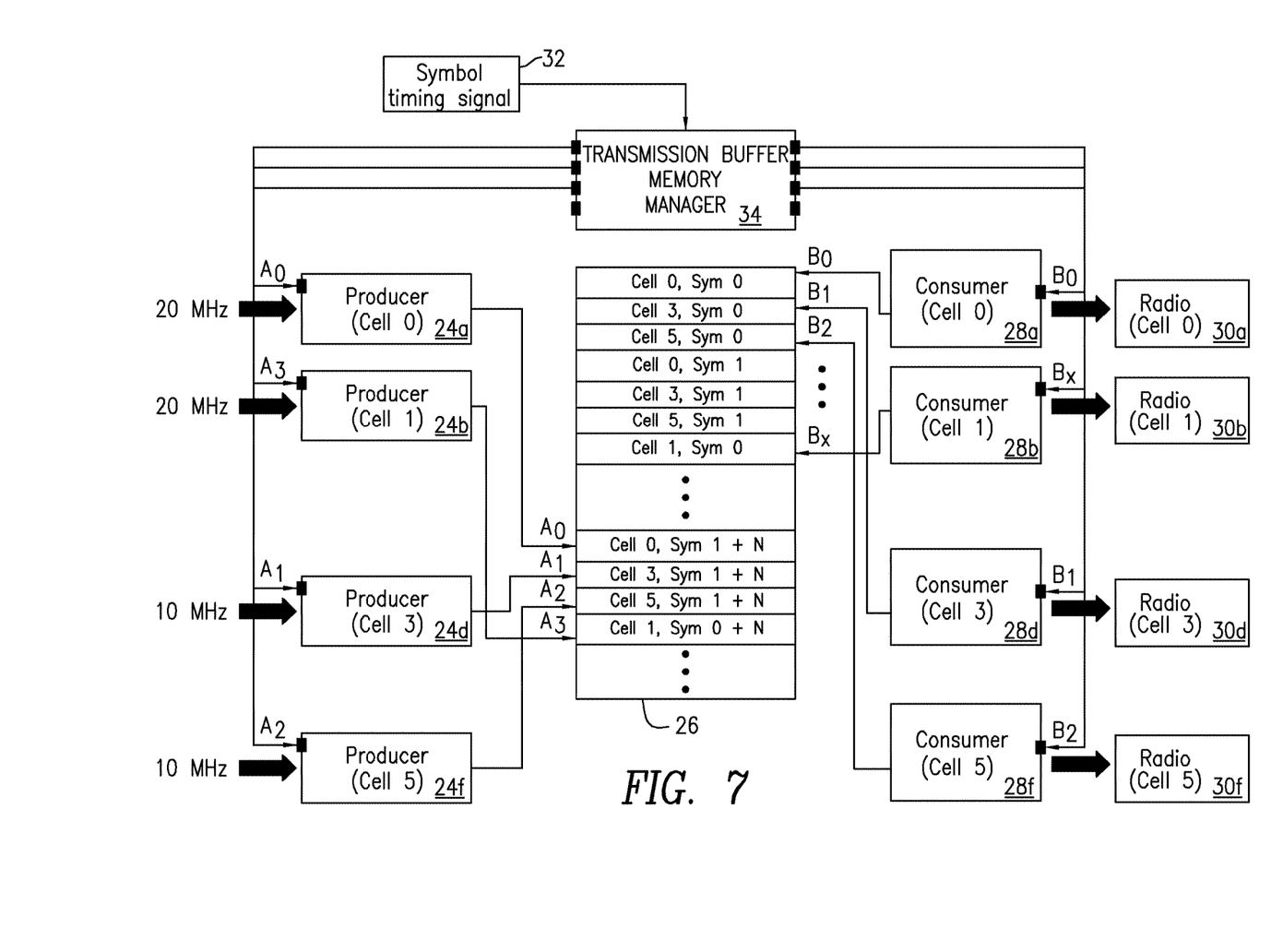
FIG. 7 is a block diagram of the embodiment of FIG. 6 with the addition of a new cell showing that no memory fragmentation occurs.

FIG. 7 is a block diagram of the embodiment of FIG. 6 with the addition of a new cell 1, having a producer 24*b*, a buffer consumer 28*b* and a radio 30*b*. FIG. 7 shows that addition of a new cell having a larger bandwidth than some other cells, e.g., 20 Mhz vs. 10 MHz, does not cause a fragmentation problem since a symbol for the new cell 1, is written at a next unwritten memory address A3 having an address space proportional to the bandwidth of the new cell 1 (20 MHz) with a corresponding read operation at an address of A3-N.

Figure 8:
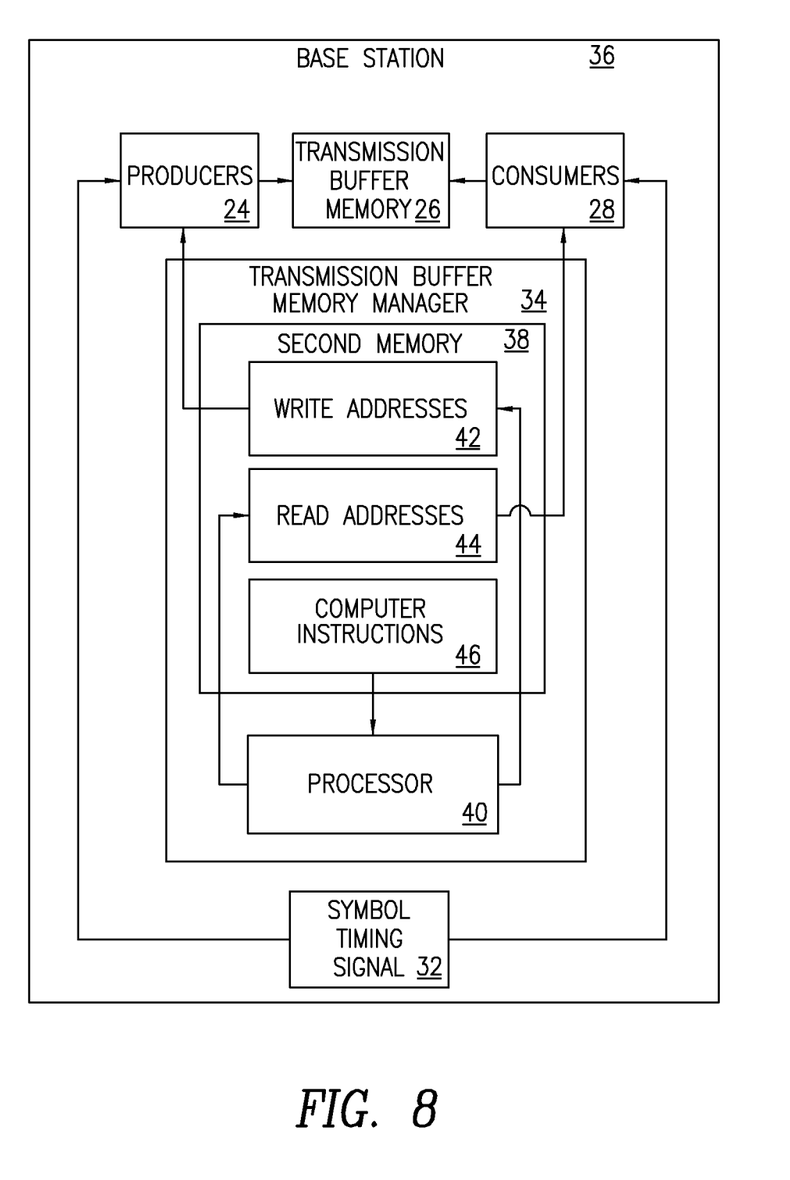
FIG. 8 is a block diagram of a base station having a transmission buffer memory manager.

FIG. 8 is a block diagram of a base station 36 having producers 24, a transmission buffer memory 26, buffer consumers 28 and a symbol timing signal 32 whose operations and functions are as described above. The operations and functions of the transmission buffer memory manager 34 are also as described above. The transmission buffer memory manager 34 includes a second memory 38 which may be physically different from the transmission buffer memory 26 or can be part of the same physical memory device, and also includes a processor 40. The second memory 38 is configured to store write addresses 42 and read addresses 44 of the transmission buffer memory 26.

The second memory 38 of the transmission buffer memory manager 34 also stores executable computer instructions that, when executed by the processor 40, configure the processor to perform functions of the transmission buffer memory manager 34. These functions include determining for each active cell of the base station 36, a size of an address space of the transmission buffer memory 26 configured to store a symbol of the corresponding active cell, where the size of the address space is proportional to a bandwidth of the cell to which a symbol corresponds. Note that functions of the transmission buffer memory manager 34 may be executed by a processor 40 that also performs other base station functions.

The processor 40 is also configured to determine a first write address 42 in the transmission buffer memory 26 at which a symbol of a first cell of the plurality of active cells is to be written. The processor 40 also determines a second write address 42 in the transmission buffer memory 26 at which a symbol of the a second active cell of the plurality of active cells is to be written, where the second write address 42 is offset from the first write address 42 by an address space of the first cell.

The processor is configured to trigger a first one of the producers 24 to write a symbol of the first cell of the plurality of active cells to the transmission buffer memory 26 at the first write address 42. The processor is also configured to trigger a second one of the producers 24 to write a symbol of the second cell of the plurality of active cells to the transmission buffer memory 26 at the second write address 42. The processor is further configured to trigger one of the buffer consumers 28 to read a symbol from the transmission buffer memory 26 at a read address 44 that is offset from the first write address by a predetermined amount, N.

Figure 9:
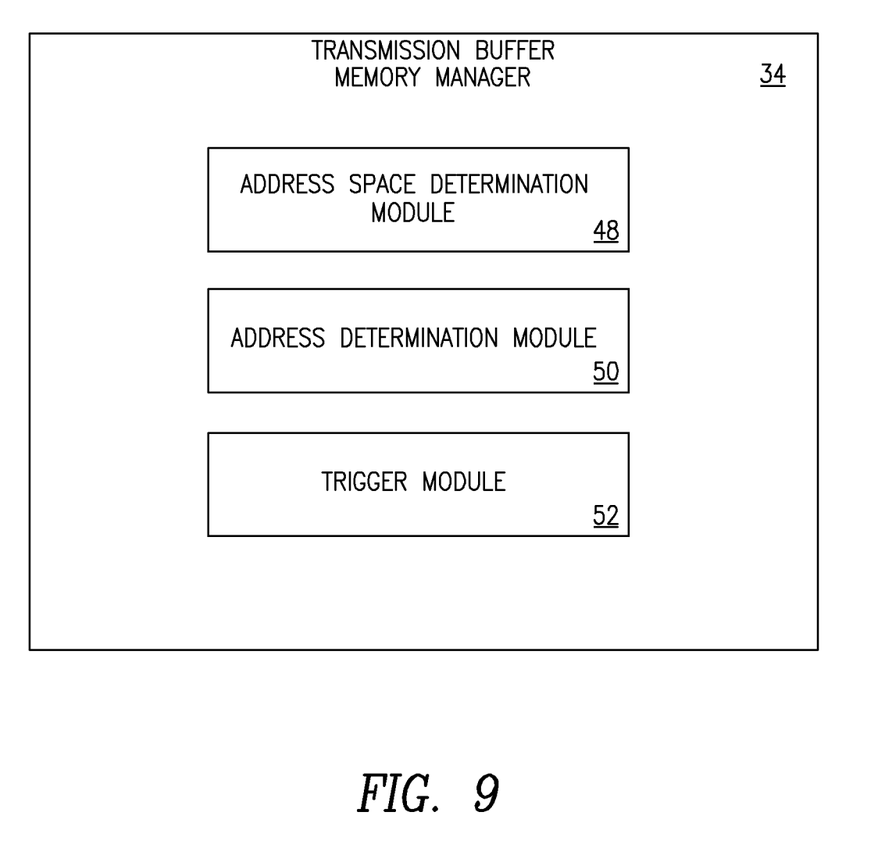
FIG. 9 is a block diagram of an alternative embodiment of the transmission buffer memory manager.

FIG. 9 is a block diagram of an alternative embodiment of the transmission buffer memory manager 34. An address space size determination module 48 is configured to determine for each active cell of the base station, a size of an address space of the transmission buffer memory 26 configured to store a symbol of the corresponding active cell, where the size of the address space is proportional to a bandwidth of the cell to which a symbol corresponds.

The transmission buffer memory manager 34 includes an address determination module 50 configured to determine a first write address and a second write address. The first write address is an address in the transmission buffer memory 26 at which a symbol of a first cell of the plurality of active cells is to be written. The second write address is an address in the transmission buffer memory 26 at which a symbol of a second active cell of the plurality of active cells is to be written. The second write address is offset from the first address by an address space of the first cell. Note that in some embodiments, the functions of the transmission buffer memory manager 34 may be distributed among producers 24 and buffer consumers 28 in a way that ensures sequential operation of the address space and address determination modules 48 and 50.

The transmission buffer memory manager 34 also includes a triggering module 52 configured to trigger a first producer to write a symbol of the first cell of the plurality of active cells to the transmission buffer memory at the first write address. The triggering module 52 is also configured to trigger a second producer to write a symbol of the second cell of the plurality of active cells to the transmission buffer memory at the second write address. Also, the triggering module 52 is configured to trigger a buffer consumer to read a symbol from the transmission buffer memory at a read address that is offset from the first address by a predetermined amount.

Figure 10:
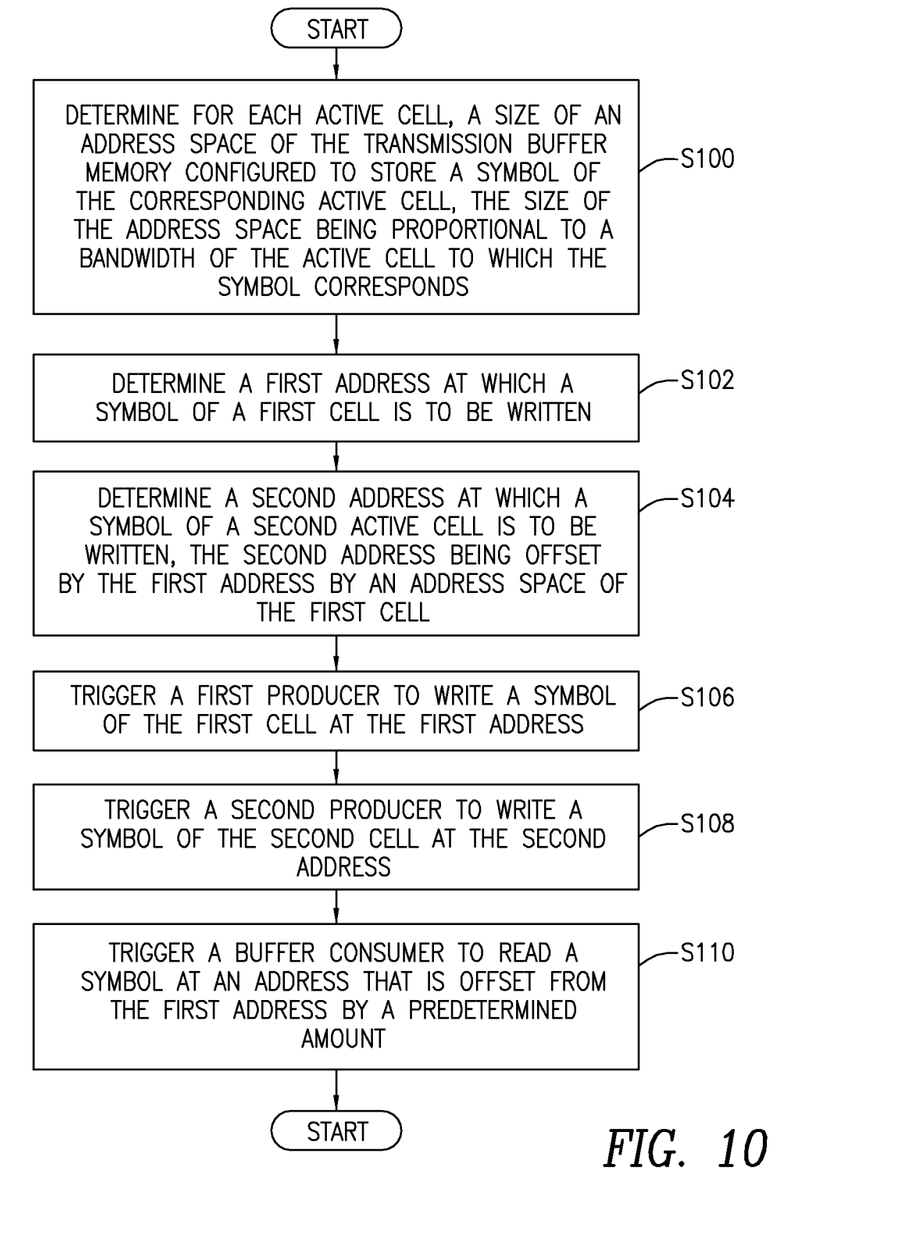
FIG. 10 is a flowchart of an exemplary process for managing a transmission buffer memory.

FIG. 10 is a flowchart of an exemplary process for managing a transmission buffer memory 26 for a base station having a plurality of cells that avoids memory fragmentation when cells are removed and added. For each active cell of the base station, a size of an address space of the transmission buffer memory 26 to store a symbol of the cell is determined. The size of the address space for a symbol of a cell is proportional to the bandwidth of the cell (block S100). A first address of the transmission buffer memory 26 at which a symbol of a first cell is to be written is determined (block S102). A second address of the transmission buffer memory 26 at which a symbol of a second cell is to be written is determined. The second address is offset from the first address by an address space of the first cell's symbol (block S104).

A first producer 24 is triggered to write a symbol of the first cell at the first address (block S106). A second producer 24 is triggered to write a symbol of the second cell at the second address (block S108). A buffer consumer 28 is triggered to read a symbol at an address that is offset from the first address by a predetermined amount (block S110).

By sharing a common circular memory among the active cells, the problem of fragmentation of memory is overcome with minimal software complexity and achieves a reduction of overall memory required.

Embodiments described herein can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. Embodiments can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present embodiments is not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for managing a transmission buffer memory at a base station in a wireless communication system, the transmission buffer memory being a circular memory writable by a plurality of producers there being a corresponding producer for each of a plurality of active cells of the base station, the transmission buffer memory configured to receive a symbol at a time from each producer, the transmission buffer memory being readable by a plurality of buffer consumers, there being a corresponding buffer consumer for each of the plurality of active cells, the transmission buffer memory configured to have a symbol at a time read by each buffer consumer, the method comprising:
   determining, for each active cell of the base station, a size of an address space of the transmission buffer memory configured to store a symbol of the corresponding active cell, the size of the address space being proportional to a bandwidth of the active cell to which a symbol corresponds;
   determining a first address in the transmission buffer memory at which a symbol of a first cell of the plurality of active cells is to be written;
   determining a second address in the transmission buffer memory at which a symbol of a second active cell of the plurality of active cells is to be written, the second address being offset from the first address by an address space of the first cell;
   triggering a first producer to write a symbol of the first cell of the plurality of active cells to the transmission buffer memory at the first address;

triggering a second producer to write a symbol of the second cell of the plurality of active cells to the transmission buffer memory at the second address; and triggering a buffer consumer to read a symbol from the transmission buffer memory at an address that is offset from the first address by a predetermined amount.

2. The method of claim 1, further comprising synchronizing timing of the reading from and writing to the transmission buffer memory of symbols of a cell.

3. The method of claim 1, wherein the predetermined amount is an amount of memory sufficient to store symbols of additional cells of the base station to be activated.

4. The method of claim 1, wherein the predetermined amount is sufficient to avoid overwrite of data caused by software jitter.

5. The method of claim 1, wherein the reading of symbols of cells from the transmission buffer memory is serialized so that a symbol is read for one cell after another and wherein the writing of symbols of the cells to the transmission buffer memory is serialized so that a symbol is written for one cell after another.

6. The method of claim 1, wherein the total memory of the transmission buffer memory is based on a total number of cells supportable by the base station and an expected bandwidth of each cell.

7. The method of claim 1, wherein the offset is an integer number N of symbols.

8. The method of claim 1, further comprising writing a symbol from a producer corresponding to a newly activated cell, the writing being at an address offset from the address most recently written by a producer corresponding to a previously existing cell by the address space of the previously existing cell.

9. The method of claim 1, further comprising de-assigning an address assigned to a cell when the cell is deactivated.

10. The method of claim 1, further comprising storing:
 a size of an address space of the transmission buffer memory for each cell;
 an address of each symbol written to the transmission buffer memory; and
 an address of the transmission buffer memory to write a next symbol.

11. A transmission buffer memory manager for managing a transmission buffer memory at a base station serving a plurality of cells, the transmission buffer memory being a circular memory writable by a plurality of producers, there being a corresponding producer for each of a plurality of active cells of the base station, the transmission buffer memory being readable by a plurality of buffer consumers, there being a corresponding buffer consumer for each of the plurality of active cells, the transmission buffer memory manager comprising:
 a processor;
 a memory configured to store computer instructions that, when executed by the processor, configure the processor to:
  determine for each active cell of the base station, a size of an address space of the transmission buffer memory configured to store a symbol of the corresponding active cell, the size of the address space being proportional to a bandwidth of the cell to which a symbol corresponds;
  determine a first address in the transmission buffer memory at which a symbol of a first cell of the plurality of active cells is to be written;
  determine a second address in the transmission buffer memory at which a symbol of the a second active cell of the plurality of active cells is to be written, the second address being offset from the first address by an address space of the first cell;

trigger a first producer to write a symbol of the first cell of the plurality of active cells to the transmission buffer memory at the first address;

trigger a second producer to write a symbol of the second cell of the plurality of active cells to the transmission buffer memory at the second address; and trigger a buffer consumer to read a symbol from the transmission buffer memory at an address that is offset from the first address by a predetermined amount.

12. The transmission buffer memory manager of claim 11, further comprising a symbol timing signal to synchronize the reading from and writing to the transmission buffer memory of symbols of a cell.

13. The transmission buffer memory manager of claim 11, wherein the predetermined amount is an amount of memory sufficient to store symbols of additional cells of the base station to be activated.

14. The transmission buffer memory manager of claim 11, wherein the predetermined amount is sufficient to avoid overwrite of data caused by software jitter.

15. The transmission buffer memory manager of claim 11, wherein the processor is configured to serialize the reading of symbols of cells from the transmission buffer memory so that a symbol is read for one cell after another and to serialize the writing of symbols of the cells to the transmission buffer memory so that a symbol is written for one cell after another.

16. The transmission buffer memory manager of claim 11, wherein the total memory of the transmission buffer memory is based on a total number of active cells supportable by the base station and an expected bandwidth of each active cell.

17. The transmission buffer memory manager of claim 11, wherein the offset is an integer number N of symbols.

18. The transmission buffer memory manager of claim 11, wherein the processor is further configured to write a symbol from a producer corresponding to a newly activated cell, the writing being at an address offset from the address most recently written by a producer corresponding to a previously existing cell by the address space of the previously existing cell.

19. The transmission buffer memory manager of claim 11, wherein the processor is further configured to de-assign an address assigned to a cell when the cell is deactivated.

20. The transmission buffer memory manager of claim 11, further comprising additional memory to store:
 a size of an address space of the transmission buffer memory for each cell;
 an address of each symbol written to the transmission buffer memory; and
 an address of the transmission buffer memory to write a next symbol.

21. A transmission buffer memory manager for managing a transmission buffer memory at a base station serving a plurality of cells, the transmission buffer memory being a circular memory writable by a plurality of producers, there being a corresponding producer for each of a plurality of active cells of the base station, the transmission buffer memory being readable by a plurality of buffer consumers, there being a corresponding buffer consumer for each of the plurality of active cells, the transmission buffer memory manager comprising:
 an address space size determination module configured to determine for each active cell of the base station, a size of an address space of the transmission buffer memory configured to store a symbol of the corresponding active cell, the size of the address space being proportional to a bandwidth of the cell to which a symbol corresponds; and an address determination module configured to:
- determine a first address in the transmission buffer memory at which a symbol of a first cell of the plurality of active cells is to be written;
- determine a second address in the transmission buffer memory at which a symbol of the a second active cell of the plurality of active cells is to be written, the second address being offset from the first address by an address space of the first cell;

a triggering module configured to:
- trigger a first producer to write a symbol of the first cell of the plurality of active cells to the transmission buffer memory at the first address;
- trigger a second producer to write a symbol of the second cell of the plurality of active cells to the transmission buffer memory at the second address; and
- trigger a buffer consumer to read a symbol from the transmission buffer memory at an address that is offset from the first address by a predetermined amount.

22. The transmission buffer memory manager of claim 21, further comprising a symbol timing signal module configured to synchronize the reading from and writing to the transmission buffer memory of symbols of a cell.

23. The transmission buffer memory manager of claim 21, wherein the triggering module is further configured to serialize the reading of symbols of cells from the transmission buffer memory so that a symbol is read for one cell after another and to serialize the writing of symbols of the cells to the transmission buffer memory so that a symbol is written for one cell after another.

24. The transmission buffer memory manager of claim 21, wherein the total memory of the transmission buffer memory is based on a total number of cells supportable by the base station and an expected bandwidth of each cell.

* * * * *

UNITED STATES PATENT AND TRADEMARK OFFICE
CERTIFICATE OF CORRECTION

PATENT NO. : 9,629,151 B2
APPLICATION NO. : 14/433143
DATED : April 18, 2017
INVENTOR(S) : Fiallos et al.

It is certified that error appears in the above-identified patent and that said Letters Patent is hereby corrected as shown below:

In the Drawings

In Fig. 10, Sheet 10 of 10, delete " 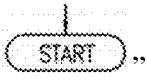 " and insert -- 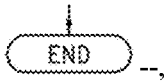 --, therefor.

In the Specification

In Column 1, Line 50, delete "time $t_o$." and insert -- time $t_0$. --, therefor.

In Column 6, Line 8, delete "channel" and insert -- channel. --, therefor.

In Column 7, Line 18, delete "24,is" and insert -- 24 is --, therefor.

In Column 8, Lines 5-6, delete "manager 26" and insert -- manager 34 --, therefor.

In Column 8, Line 17, delete "((radios" and insert -- (radios --, therefor.

In the Claims

In Column 10, Line 42, in Claim 1, delete "producers" and insert -- producers, --, therefor.

In Column 12, Line 67, in Claim 21, delete "corresponds; and" and insert -- corresponds; --, therefor.

In Column 13, Line 9, in Claim 21, delete "cell;" and insert -- cell; and --, therefor.

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*